Patented Oct. 8, 1940

2,216,844

UNITED STATES PATENT OFFICE 2,216,844

PROCESS FOR SOFTENING WATER

Georg Walter Kühl, Helmstedt, Braunschweig, Germany

No Drawing. Original application October 7, 1936, Serial No. 104,538, now Patent No. 2,133,895, dated October 18, 1938. Divided and this application October 26, 1937, Serial No. 171,147. In Germany July 25, 1936

5 Claims. (Cl. 210—23)

The present application is a division of applicant's co-pending application, Serial No. 104,538, filed October 7, 1936 which has matured into Patent Number 2,133,895, Oct. 18, 1938.

The hardening constituents precipitated by means of alkaline precipitating agents in the softening of water are difficult to separate because of the colloidal size of their particles. To facilitate this separation and thus obtain an accelerated flocculation, it has been proposed to add to the water after the introduction thereinto of the softening chemicals, special coagulants such as aluminum sulphate, copper sulphate, iron chloride or iron sulphate. By means of these materials, the fine suspended particles are enveloped and then separate more easily. The softening process is however made more expensive by the addition of these chemicals. Furthermore, by means of these metal salts a portion of the alkaline softening agents is decomposed with formation of objectionable neutral salts in the softened water. The latter disadvantage can be overcome by adding an aluminate as coagulant, but owing to the high cost of such material and its low efficiency due to being added in already prepared form this proposal is not practical. The present invention is based on the discovery that instead of using metal salts, the corresponding metals, or metal alloys, themselves can be used, provided, however, that they are not added to the water treated with the softening chemicals, but to the solution of the softening agents before their introduction into the water to be treated. An advantage of using the metals themselves is that the coagulant, for example, the aluminate, formed from the metal in the course of the process, is in nascent state and therefore much more active than an addition of already prepared salt. Specifically, the process can be carried out by introducing the suitable metal or metal alloys in the form of cuttings or pieces, into the vessel containing the solution or equipment for preparing the softening agents, which vessel is provided in known manner with agitating means, whereby an intimate mixing is obtained. In this procedure, a concentrated solution of the softening agent thus acts upon the metal or metal alloy, whereby in a very brief time sufficient metal goes into solution to produce acceleration of the flocculation of the hardening constituents after their chemical precipitation. The introduction of the metal or metal alloys directly into the water mixed with the softening chemicals, that is, into the reaction vessel, would not be a useful solution of the problem for the following reasons. Firstly, the dilution of the solution agent by the water to be treated is so great that it would take an objectionably long time for sufficient metal to go into solution to achieve the intended result. Furthermore, the softening chemicals react with the hardening constituents of the water to be treated, wholly, or to the greater part, immediately on being added to said water, and are not capable of exerting further solvent action on the metal subsequently.

By means of the present invention, the expensive chemicals previously required can be substituted by cheaper metal particles, particularly as it is possible to use scrap or waste particles of suitable metals or alloys.

Particularly good results are achieved by using as the precipitating agent a metal alloy which will go into solution with formation of complex salts, desirably complex salts of partly colloidal nature. The best results have been obtained by the use of an aluminum brass alloy consisting, for example, of

| | Per cent |
|---|---|
| Aluminum | 85–90 |
| Copper | 5–10 |
| Zinc | 1.5–4.5 |
| Lead | 0.5–2.5 |

By means of the process of the invention, the softening agents added to the water are, so to speak, impregnated with the complex metal salts going into solution.

Obviously other metals or metal alloys can be employed. The condition in every case is that the metal or metal alloys, shall possess in the alkaline solution, a certain, even if small, solution tension.

The process according to the invention can also be carried out in the manner that the solution of precipitating agent, before its introduction into the water to be treated, is filtered through a bed of fragments or turnings of the metal or metal alloys in question, so that the solution is brought into intimate contact with the metal by flowing through the interstices.

Experiments have shown that by the process of the invention the reaction time can be reduced to a few minutes, while a relatively complete softening can be achieved, even in the cold, with the use of merely theoretical quantities of the agent. The process also has the advantage of a desirable maintenance of low alkalinity of the water.

As an example of the operation of the invention, a water of the following content was treated:

|  | German degrees |
|---|---|
| Total hardness | 20.15 |
| Lime hardness | 14.94 |
| Carbonate hardness | 12.32 |
| Non-carbonate hardness | 7.84 |
| Magnesia hardness | 5.22 |

The water was softened with lime soda in the usual manner without addition of coagulants, and gave, after treatment for 10 minutes at 15° C., a residual hardness of 9.8 German degrees. On treating the same water under substantially similar conditions employing the softening agents according to the present invention and using the above-mentioned aluminum alloy, the water was found, in the same period of treatment, to have a residual hardness of only 1 German degree.

I claim as my invention:

1. A process for chemically softening water comprising introducing into a solution of alkaline softening agents at least one of the metals which is dissolvable in and is selected from the group consisting of aluminium, zinc, copper, lead and alloys thereof to form a water treating material, adding said material after at least partial solution of said metal to the water to be softened, and filtering out the precipitated and coagulated hardening agent.

2. A process for chemically softening water comprising introducing into a solution of alkaline softening agents at least one of the metal alloys selected from the group consisting of aluminum, zinc, copper and lead which is dissolvable in said solution and enters the solution as a complex-salt with partial colloidal character to form a water treating material, adding said material after at least partial solution of said metal to the water to be softened, and filtering out the precipitated and coagulated hardening agent.

3. A process for chemically softening water comprising introducing into a solution of alkaline softening agents at least one of the aluminum-brass alloys to form a water treating material, adding said material after at least partial solution of said metal to the water to be softened, and filtering out the precipitated and coagulated hardening agent.

4. A process according to claim 1, in which the metal is in the form of chips.

5. A process for chemically softening water comprising filtering a solution of alkaline softening agent through a bed of metal particles selected from the group consisting of aluminum, zinc, copper, lead and alloys thereof in such a manner that it is brought into intimate contact with the metal in the narrow grooves of the bed to form a water treating material, adding said material after at least partial solution of said metal to the water to be softened, and filtering out the precipitated and coagulated hardening agent.

GEORG WALTER KÜHL.